Figure 1:
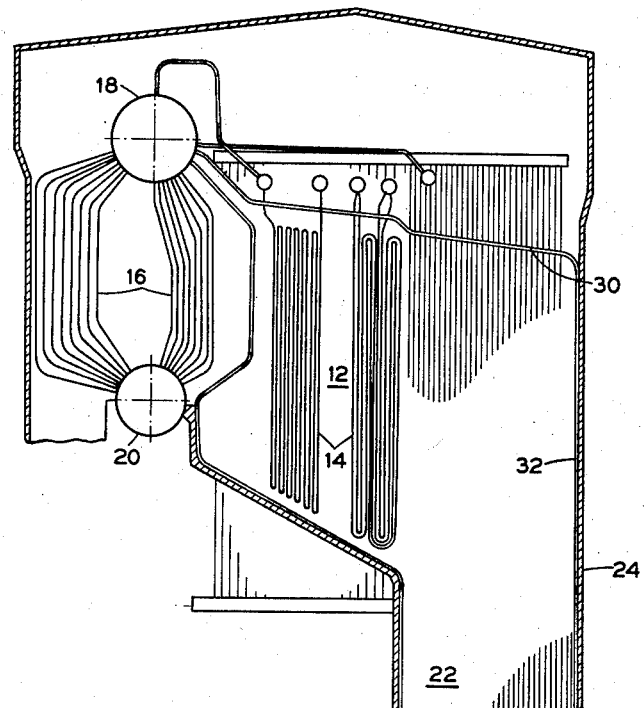

April 29, 1958  R. K. ALLEN  2,832,321
CYCLONE FURNACE FIRED FLUID HEATING UNIT
Filed March 24, 1955

INVENTOR.
ROBERT K. ALLEN
BY
ATTORNEY

2,832,321

CYCLONE FURNACE FIRED FLUID HEATING UNIT

Robert K. Allen, Ridgewood, N. J., assignor to The Babcock & Wilcox Company, New York, N. Y., a corporation of New Jersey Application March 24, 1955, Serial No. 496,451

4 Claims. (Cl. 122—235)

The present invention relates to the construction and operation of cyclone furnace fired fluid heating units heated by the combustion of a coarsely pulverized or "granulated" slag-forming solid fuel in a helical flow path in a substantially separate furnace chamber of circular transverse cross-section under combustion conditions providing a mean furnace temperature above the fuel ash fusion temperature, thus insuring the separation in and discharge of the fuel ash residue from the furnace chamber as a molten slag. Approximately 85–90% of the recoverable ash can be separated in the furnace chamber in this manner and discharged in a stream into a subjacent portion of the vapor generating unit in which the fluidity of the slag is maintained by exposure to the radiant heating effect of the high temperature gases discharging from the furnace chamber. The remaining slag particles are carried out of the furnace chamber in suspension in the outgoing high velocity gases and directed through a gas cooling chamber of substantial length in which the gas temperature is reduced by radiant heat transfer to the fluid cooled walls of the chamber to a value below the fuel ash fusion temperature, before the gases come into contact with any convection heated fluid heating tubes.

In the operation of a cyclone furnace of the character described, the centrifugal effect on the burning fuel and air stream causes the separated slag particles to deposit in a fluid condition on the walls of the furnace chamber and form a fluid layer of slag thereon onto which the coarser fuel particles are deposited and are burned in situ by the scrubbing action of the secondary air streams. The excess slag flows down the furnace chamber walls and collects in the lowermost section of the chamber where the slag outlet is normally located. In practice it has been found that the most efficient furnace operation in terms of fuel burning efficiency, slag separation and collection, and slag discharge, is attained when the cyclone furnace is positioned with its major axis substantially horizontal and the high temperature gases discharge through a re-entrant throat positioned in a vertical wall of the fluid heating unit and the molten slag is also discharged through said vertical wall into a subjacent chamber. Cyclone furnace fired fluid heating units of this type are disclosed in U. S. Patents Nos. 2,357,301 and 2,594,312.

As disclosed in said prior Patent 2,594,312, the portion of the unit between the cyclone furnace and the first bank of convection heated tubes is divided into a lower slag-collecting section and an upper gas cooling section by means of an inclined water-cooled reflecting arch and a water-cooled tube screen. With this arrangement the high temperature heating gases discharging from the cyclone furnace chamber into the adjacent slag-collecting chamber will be directed downward by the reflecting arch along the chamber bottom. The gases then flow through the water cooled tube screen and pass upwardly through the gas cooling chamber to the convection heating section. The arch and tube screen serve two main purposes: first, to remove most of the slag particles remaining in the gases after discharge from the cyclone furnace; and, second, to maintain a gas temperature in the slag-collecting chamber sufficient to assure slag fluidity at the slag discharge taps over a wide range of operating loads. Such an arch and tube screen arrangement adds considerably to the cost of construction of the unit and the complexity of its erection. Furthermore, the relatively large fluid cooled bottom area on which the slag collects and the amount of fluid cooled wall area between the cyclone furnace throat and the side wall slag tap opening in the slag-collecting chamber makes it difficult to keep the slag tap opening clear, particularly during low load operation.

In accordance with the present invention, the portion of a vapor generating unit of the character described between the cyclone furnace throat and the first bank of convection heated tubes is defined by fluid cooled walls forming a vertically elongated and unobstructed chamber of rectangular horizontal cross-section having a lower vertical portion extending beyond the vertical dimensions of the cyclone furnace and the outer vertical wall of which is positioned opposite the cyclone furnace throat at a distance therefrom and from the vertical wall through which it opens, short enough to insure that the discharging gases and suspended slag particles will impact on the outer wall at a velocity sufficient to cause most of the suspended slag particles in a molten or sticky condition to adhere to the outer wall, while large enough that the discharging gases will not flow upwardly through the narrow chamber at a velocity which would cause the slag deposited on the outer or "target" wall to be forced upwardly on the surface thereof into a wall area in which it would freeze and build up to an undesirable extent or to be picked up by the gases and carried into the convection heating section. With this arrangement the deposited slag flows down the target wall to a slag collecting zone exposed to heat radiation from the discharging gases, which flow upwardly through the progressively increasing gas flow area of the upper portion of the chamber. In the upper section the relatively few slag particles remaining in suspension are solidified by radiant heat transfer to the fluid cooled boundary walls before reaching the first convection heated tube bank. This construction of the portion of the unit between the cyclone furnace and the first convection heated tube bank substantially reduces the cost of construction and erection of the unit, while providing a self-cleaning slag deposition area for effectively removing the slag particles carried out of the cyclone furnace in suspension in the heating gases discharged.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Figure 2:
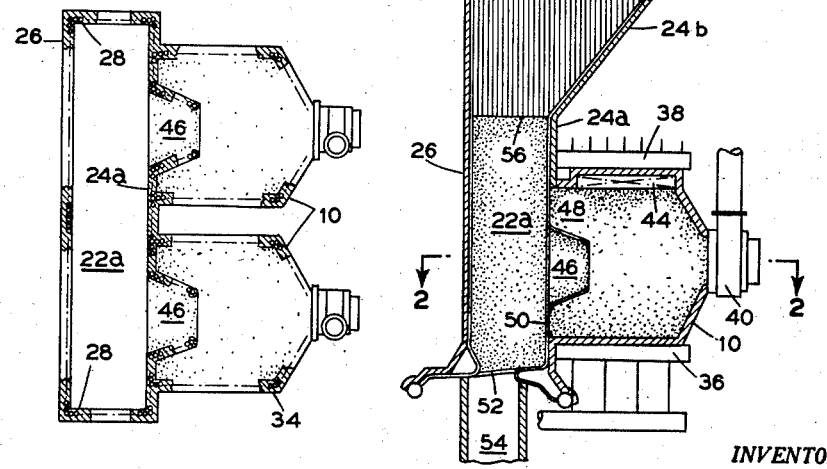

In the drawings:

Fig. 1 is a sectional elevation of a cyclone furnace fired steam generating and superheating unit constructed in accordance with the invention; and Fig. 2 is a transverse horizontal section taken on the line 2—2 of Fig. 1.

The steam generating and superheating unit illustrated comprises one or more cyclone furnaces 10 and an upper convection heating pass 12 containing banks of steam superheating tubes 14 and banks of steam generating tubes 16 extending between an upper steam and water drum 18 and a lower water drum 20, the inlet of the superheater 14 being connected to the upper drum 18 in a well known manner. The supreheater end of the convection heating pass 12 and the outlet end of the cyclone furnace or furnaces 10 are connected by a vertically elongated unobstructed chamber 22 of rectangular cross-section throughout its height defined by a vertical front wall 24, rear wall 26, side walls 28 and roof 30, and proportioned as hereinafter described. The walls and roof are lined with closely spaced steam generating tubes 32 which form part of the steam generating surface of the unit.

As shown in Fig. 1, the cyclone furnace 10 is of horizontally elongated substantially circular cross-section with its major axis arranged substantially horizontal, the furnace chamber being formed by closely spaced studded tubes 34 covered by a layer of suitable refractory material and proportioned under normal conditions of operation to maintain a furnace temperature over the designed load range above the fuel ash fusion temperature. The tubes 34 are connected to bottom and top headers 36 and 38, respectively, which are connected into the boiler circulating system by means of appropriate supply and riser tubes. Coarsely pulverized or "granulated" bituminous or semi-bituminous coal, carried in a stream of preheated primary air, is introduced tangentially into a primary burner 40 through a conduit 42. The primary burner 40, centrally located at the outer end of the cyclone furnace, imparts a whirling motion to the coal and primary air mixture as it enters the furnace chamber. By centrifugal action the coarse particles of coal are thrown into and become imbedded in the thin layer of molten slag which is normally present on the inner surface of the furnace walls, and are burned by the scrubbing action of the high-velocity secondary air admitted tangentially through ports 44 along the furnace length in the same direction of rotation as the primary air and coal. The high velocity of the burning fuel and air causes the gas stream to follow a helical path toward the rear of the furnace where the gas reverses direction before entering a throat 46. The re-entrant outlet throat is formed by the water tubes defining the lower part of the front wall 24a. The gas flow reversing action effected by an annular pocket 48 facilitates the separation of suspended slag particles from the outgoing gases and retards the discharge of combustibles from the cyclone furnace 10. The gases discharged from the throat 46 contain little, if any, combustible matter, combustion being substantially completed in the furnace. A small amount of fly ash and molten particles is present in suspension in the outgoing gases, and this residue is largely removed in the chamber 22a as hereinafter described. Molten slag resulting from combustion continuously discharges through an opening 50 at the rear of the cyclone furnace 10 and flows down to the slag pool on the floor of the radiant chamber, whence it is continuously drained through a slag tap opening 52 into a slag tank 54, along with ash and slag particles which may be separated in the radiant chamber.

From the cyclone furnace 10 the gases discharge into the lower or slag-collecting section 22a of the vertically elongated radiant chamber. The lower portion 22a of this radiant chamber has the chamber side of the tubes covered with a high temperature non-metallic refractory material maintained in position by studs which are welded to the generating tubes. The wall tubes in the upper portion 22 of the radiant chamber are preferably left exposed to the heating effect of the gases. The dividing line between the lower 22a and upper 22 portions of the radiant chamber is indicated at 56.

The radiant chamber has a vertically inclined wall section 24b extending downwardly from an upright wall section 24 and thereby affording an offset space permitting the location of the cyclone furnace or furnaces directly underneath the upper portion of the radiant chamber.

The relative proportions of the radiant chamber parts, and particularly of the depth and width of the lower portion of the radiant chamber, form an important part of the present invention. The determining factor in spacing the lower walls of the radiant chamber is the gas mass velocity (which is, in this case, the pounds of gas per hour per square foot of horizontal cross-sectional area). The lower rear wall 26 must be positioned so that the slag particles in the high velocity gases discharging from the cyclone furnace will impact on the wall 26 and the horizontal cross-sectional area of the lower chamber 22a must be large enough so that the impacted slag is not forced upward or picked up by the upflowing gases. I have determined that the gas mass velocity required to satisfy both of these requirements should be not over 6000 pounds per hour per square foot at the maximum continuous steam load, and preferably not less than 5000 pounds per hour per square foot. In general a depth of lower radiant chamber approximately two-thirds of the cyclone furnace diameter has been found satisfactory. For example, in one such installation with 7 foot diameter cyclone furnaces, the inner side of the target wall was 4'9" from the opposite wall. With the lower walls so arranged, the products of combustion from the cyclone furnace discharge into the lower zone of the radiant chamber and due to the proximity of the target wall 26 the gas stream impacts on the target wall and is forced to move upward. The adhesive property of the slag particles and this relatively abrupt change in direction of movement of the gas stream results in most of the remaining ash and slag particles in suspension being deposited on the target wall 26 and from there drained downwardly to the slag tap 52.

Sustained low load operation with bituminous or semi-bituminous coal firing in a cyclone furnace is usually limited to the minimum load at which slag can be tapped from the radiant chamber. The open radiant chamber arrangement with the lower walls spaced to give a gas mass velocity of 5000–6000 pounds per hour per square foot at the maximum operating load has the further advantage that a lower minimum load is obtainable without encountering slag flow difficulty. The factors that determine the heat loss from the lower portion 22a of the radiant chamber are:

(1) The quantity and effectiveness of the heat absorbing surface in the lower portion of the radiant chamber; and (2) The radiation loss to the heat absorbing surface in the upper portion 22 of the radiant chamber.

The rate of heat absorption by the lower wall surface is relatively low because of the refractory covering on the tubes and the small amount of surface in the lower portion of the radiant chamber compared to prior arrangements. The radiant heat from the lower radiant chamber zone reaching the upper part of the radiant chamber is a direct function of the ratio of the depth of the lower radiant chamber to the height of the lower radiant chamber. In other words, the heat loss from the lower radiant chamber decreases with a decrease in the depth of the lower radiant chamber, assuming that the height of the lower radiant chamber is held constant. The minimum depth is established by the point where slag would be forced upward on the lower rear wall 26. The temperature of the gases in the lower radiant chamber depends upon the heat loss. With the lower radiant chamber arranged as hereinbefore described, tests have shown that slag fluidity can be maintained over a wider load range than heretofore obtained due to the low heat loss characteristic of the chamber.

Thus, the functions of the arch and screen in previously proposed arrangements are largely realized by the disclosed arrangement of the lower radiant chamber. The omission of the arch and screen in the present invention results in a substantial simplification of construction and rearrangement of the remaining radiant chamber elements, whereby substantially the same result is obtained by a less number of parts, with the accompanying benefits of saving in construction costs and reduction in draft loss.

Although the upper portion of the radiant chamber has a large horizontal cross-section relative to the lower portion, there is no fixed relation between these zones. The relative proportions of the upper radiant chamber parts are based on factors such as required steam pressure and temperature, feed water temperature, steam output at the maximum load and the desired radiant chamber exit gas temperature.

At the upper part of the radiant chamber, the gases turn to the left, flow over the superheater sections and then pass across a bank of upright steam generating tubes 16, which directly connect the drums 18 and 20. Beyond the bank of steam generating tubes, the gases flow to other appropriate heat trap equipment.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A fluid heating unit comprising a convection heated fluid heating section, walls including fluid cooled tubes defining a combustion chamber of substantially circular cross-section, a fluid cooled wall at one end of said combustion chamber including an inwardly projecting throat forming a gas outlet surrounded by an annular pocket, means for burning a slag-forming solid fuel in said combustion chamber at a mean chamber temperature above the fuel ash fusion temperature and effecting a helical path of travel thereof along the circumferential wall of said combustion chamber, a vertically elongated chamber laterally adjacent said combustion chamber and connecting the gas outlet thereof to said convection heated fluid heating section, said vertically elongated chamber including a substantially unobstructed lower section open at its upper end and having an upright outer wall opposite said gas outlet and spaced horizontally therefrom a distance not greater than the diameter of said cyclone furnace to receive the impact of a major portion of the slag particles remaining in suspension in the discharged heating gases and far enough therefrom to define a heating gas flow area in the corresponding section of said vertically elongated chamber to provide a gas mass velocity therein of not over 6000 and not less than 5000 pounds per hour per square foot at maximum load operation, a slag outlet in the lower portion of said combustion chamber subjacent the gas outlet for conducting molten slag separated in said combustion chamber to said vertically elongated chamber, and a slag outlet from said vertically elongated chamber below the level of said combustion chamber gas outlet for removing the molten slag separated from the gases flowing through said combustion and vertically-elongated chambers.

2. A fluid heating unit comprising a convection heated fluid heating section, walls including fluid cooled tubes defining a combustion chamber of substantially circular cross-section arranged with its major axis substantially horizontal, a fluid cooled wall at one end of said combustion chamber including an inwardly projecting throat forming a gas outlet surrounded by an annular pocket, means for burning a slag-forming solid fuel in said combustion chamber at a mean chamber temperature above the fuel ash fusion temperature and effecting a helical path of travel thereof along the circumferential wall of said combustion chamber, a substantially unobstructed vertically elongated chamber laterally adjacent said combustion chamber and connecting the gas outlet thereof to said convection heated fluid heating section, said vertically elongated chamber including a vertically arranged outer wall opposite said gas outlet and spaced horizontally therefrom a distance not greater than the diameter of said cyclone furnace to receive the impact of a major portion of the slag particles remaining in suspension in the discharged heating gases and far enough therefrom to define a heating gas flow area in the corresponding section of said vertically elongated chamber to provide a gas mass velocity therein of not over 6000 and not less than 5000 pounds per hour per square foot at maximum load operation, a slag outlet in the lower portion of said combustion chamber subjacent the gas outlet for conducting molten slag separated in said combustion chamber to said vertically elongated chamber, and a slag outlet from said vertically elongated chamber below the level of said combustion chamber gas outlet for removing the molten slag separated from the gases flowing through said combustion and vertically elongated chambers.

3. A fluid heating unit comprising a convection heated fluid heating section, walls including fluid cooled tubes defining a combustion chamber of substantially circular cross-section, a fluid cooled wall at one end of said combustion chamber including an inwardly projecting throat forming a gas outlet surrounded by an annular pocket, means for burning a slag-forming solid fuel in said combustion chamber at a mean chamber temperature above the fuel ash fusion temperature and effecting a helical path of travel thereof along the circumferential wall of said combustion chamber, a vertically elongated chamber laterally adjacent said combustion chamber and connecting the gas outlet thereof to said convection heated fluid heating section, said vertically elongated chamber including a substantially unobstructed lower section open at its upper end and elongated in a direction normal to the major axis of said combustion chamber, the lower section of said vertically elongated chamber including an upright outer wall opposite said gas outlet and spaced horizontally therefrom a distance close enough to receive the impact of a major portion of the slag particles remaining in suspension in the discharged heating gases and far enough therefrom to define a heating gas flow area in the corresponding section of said vertically elongated chamber to provide a gas mass velocity therein of not over 6000 and not less than 5000 pounds per hour per square foot at maximum load operation, a slag outlet in the lower portion of said combustion chamber subjacent the gas outlet for conducting molten slag separated in said combustion chamber to said vertically elongated chamber, and a slag outlet from said vertically elongated chamber below the level of said combustion chamber gas outlet for removing the molten slag separated from the gases flowing through said combustion and vertically elongated chambers.

4. A fluid heating unit comprising a convection heated fluid heating section, walls including fluid cooled tubes defining a combustion chamber of substantially circular cross-section arranged with its major axis substantially horizontal, a fluid cooled wall at one end of said combustion chamber including an inwardly projecting throat forming a gas outlet surrounded by an annular pocket, means for burning a slag-forming solid fuel in said combustion chamber at a mean chamber temperature above the fuel ash fusion temperature and effecting a helical path of travel thereof along the circumferential wall of said combustion chamber, a vertically elongated chamber laterally adjacent said combustion chamber and connecting the gas outlet thereof to said convection heated fluid heating section, said vertically elongated chamber including a vertically extending inner wall containing said gas outlet and having an outwardly inclined upper portion superjacent said cyclone furnace, said vertically elongated chamber including a vertically arranged outer wall opposite said gas outlet and spaced horizontally therefrom a distance not greater than the diameter of said cyclone furnace to receive the impact of a major portion of the slag particles remaining in suspension in the discharged heating gases and far enough therefrom to define a heating gas flow area in the corresponding section of said vertically elongated chamber to provide a gas mass velocity therein of not over 6000 and not less than 5000 pounds per hour per square foot at maximum load operation, a slag outlet in the lower portion of said combustion chamber subjacent the gas outlet for conducting molten slag separated in said combustion chamber to said vertically elongated chamber, and a slag outlet from said vertically elongated chamber below the level of said combustion chamber gas outlet for removing the molten slag separated from the gases flowing through said combustion and vertically elongated chambers and arranged to receive heat by radiation from the gases discharging from said gas outlet.

References Cited in the file of this patent

UNITED STATES PATENTS

| | | |
|---|---|---|
| 2,599,316 | Boyer | June 3, 1952 |

FOREIGN PATENTS

| | | |
|---|---|---|
| 1,061,290 | France | Nov. 25, 1953 |
| 834,123 | Germany | Mar. 17, 1952 |